United States Patent [19]
Conibear

[11] 3,816,955

[45] June 18, 1974

[54] ACTUATOR FOR ANIMAL TRAP

[76] Inventor: Frank Conibear, 2170 Evergreen Pl., Victoria, British Columbia, Canada

[22] Filed: Dec. 16, 1971

[21] Appl. No.: 208,797

[52] U.S. Cl. ............................................ 43/90
[51] Int. Cl. .......................................... A01m 23/26
[58] Field of Search ........................ 43/88, 92, 90

[56] References Cited
UNITED STATES PATENTS
1,904,188  4/1933  Zahm ................................. 43/88
2,947,107  8/1960  Lehn .................................. 43/92

*Primary Examiner*—Warner H. Camp

[57] ABSTRACT

An improved actuator for a rotating frame animal trap, wherein the ring at one end of the coil spring is provided with an opening through which the adjacent ends of the frame, about which the ring is normally disposed, can pass when the actuator is swivelled around the frame to a predetermined position, so that the actuator bias is then removed from the trap jaws. A stop may be associated with the opening in the ring to prevent the frame ends from passing through the opening when the actuator is swivelled in a particular direction. A keeper may be releasably fastened across the ring opening to minimize unwanted disengagement of the actuator. Also a releasable safety clamp may be provided for maintaining the arms of the actuator in an almost fully compressed state.

12 Claims, 5 Drawing Figures

ACTUATOR FOR ANIMAL TRAP

BACKGROUND OF THE INVENTION

This invention relates to improvements in a rotating frame animal trap. More particularly, the present invention relates to improvements concerning the actuator of the rotating frame type of trap. By a rotating frame animal trap is meant a trap which comprises a pair of similar frames made of round wire stock, which frames may be of a generally square or rectangular shape, pivotally connected at adjacent ends (end members) for relative rotation on a common axis so as to form by their sides two pairs of co-acting jaws. At least one actuator, consisting of a coil spring having arms terminating in closed rings slidable along and encircling one set of adjacent ends of the frames, is used to urge the jaws toward and, when the trap is sprung, maintain them in closed position. In my U.S. Pat. No. 3,010,245, dated Nov. 28, 1961, such a rotating frame trap is described in which the ends which co-operate with the rings are shaped so that in the set position of the trap, these ends lie substantially parallel to each other, while the central portions of these ends near the common axis of the frames form a cross with each other within the rings on the arms of the coil spring. A trigger means (for example as described in my above mentioned U.S. Pat. or in Lehn U.S. Pat. No. 2,947,107 dated Aug. 2, 1960), maintains the frames in open position when the trap is set, but when the trap is sprung releases the frames so as to permit, as a result of the action of the spring and rings on the ends, rapid rotation of the frames through an angle of about 90°, so that the jaws quickly strike and kill an animal in the trap.

Because the rings of known traps of this kind completely encircle the end members of the frames, it can be both difficult and dangerous to compress the spring means and set the trap. Moreover, trappers have sometimes experienced difficulties in getting the carcasses of caught animals out of prior traps of this type, when sprung, especially if traps and animals are frozen, because of the great squeezing power of the jaws. For this reason, it has been difficult for a trapper to free, for example, his fingers from the trap if accidentally caught therein. With larger traps, having upper and lower spring means used for animals such as otter, lynx, bobcats, wolverines, and the like, prior traps of this design are sufficiently dangerous and difficult to set or open, that some trappers prefer not to handle them alone on a trap line.

It is accordingly an object of the present invention to provide a rotating frame type animal trap which is more easily and safely set and which can be relatively easily purposefully released from closed or sprung position to free anything caught between the jaws.

SUMMARY OF THE INVENTION

In order to achieve these and other ends, a trap according to the present invention is constructed so that the ring at the end of one of the arms of the coil spring (or of both springs where two are used) is not fully closed but is instead provided with an opening of sufficient width so that the adjacent ends of the frame, around which the ring is disposed, can, when required, pass. Disengagement of the adjacent ends from the ring is achieved by swivelling the coil spring around the frames of the trap, when closed, (and therefore rotating the rings around the adjacent ends) in the direction of the opening to a position not normally achieved in either the set or sprung condition of the trap, wherein portions of the two adjacent ends can readily pass through the opening so that the ring in question becomes disengaged from the frame and all compression on the spring is accordingly released. The opening is located in a portion of the ring such that passage of the two adjacent ends through the opening while the trap is closing or while the trap is in set or closed position would be unlikely. It is preferred that this opening be located in the portion of the ring proximate to the coil spring and actuator arm. In such a location, the opening will not readily interfere with the normal operation of the actuator and trap. This opening enables the relatively easy removal of the ring in question from its normal position about adjacent ends of the frames when the trap is closed, so as to release the pressure on the jaws in the event of an emergency such as when a person's fingers are caught in the trap jaws, or to permit ready removal of animals caught in the jaws of the trap.

Should the actuator be swivelled in a direction away from the opening of the ring, although the open actuator ring would become disengaged from the frame, the associated actuator arm would become lodged against one set of jaws of the trap. The result would be that all compression on the spring would not be released and pressure would be maintained on the jaws of the trap. In order to free the actuator arm, the actuator would have to be swivelled in the opposite direction. However, the actuator arm in question could become jammed against the trap frame, making it difficult to so swivel the actuator, and a man having his hand caught in the jaws might well suffer prolonged and intense pain. In order to avoid such difficulties, a stop can be located on the open ring near the actuator arm, where it does not interfere with the normal action of the actuator ring on the trap, to prevent the actuator from being disengaged and becoming jammed when swivelled in this particular direction. The stop would do this by becoming lodged against a portion of one of the frames while the frame ends are still within the open ring, thereby preventing further rotation of the actuator in that particular direction and preventing the ends of the frames from passing through the opening in the ring.

When the actuator is disengaged and exerting no pressure on the jaws, it can be easily compressed and maintained in an almost fully compressed state by means of a safety hook or clamp associated with the arms of the coil spring. If the actuator in this almost fully compressed state is moved so that adjacent ends of the frame pass through the opening in the ring in question, and then is swivelled around the frames to normal position, the frames can be easily rotated to open position (thereby fully compressing the actuator), the trigger mechanism set, and the safety hook or clamp released. Thus, a simple, easy and safe method of setting the trap is provided. It is obvious that, where two actuators, each having an open ring, are used to bias the frames of the square or rectangular framed trap (one for each of the two pairs of adjacent ends), this feature of the ring when used in conjunction with a safety hook or clamp greatly enhances the safety of the trap since each actuator can be almost fully compressed while disengaged from normal position about the ends of the frames.

In order to minimize or prevent unwanted disengagement of the open ring from the ends of the trap, for example by a struggling animal not killed instantly when the trap is closed, the actuator may be provided with a keeper adapted to be fastened, by way of engaging means (such as, for example, two lips or a lip and the actuator arm) located on both sides of the opening of the ring across the opening in the ring, for purposeful disengagement. This keeper may be made of wire, one end of which defines a triangular opening and the other end of which is a handle-like stem. The keeper may be designed so that it must be removed by hand from its position across the ring opening before the ring can be disengaged from the adjacent ends, and can be made relatively difficult or easy to remove. Alternatively, it may be designed to that it can be removed from that position with a single push, or by pulling the actuator so that the handle-like stem of the keeper strikes against the part of the frame of the trap and is disengaged. In this latter instance, the actuator itself is automatically disengaged from the frames if the opening in the ring is suitably positioned. In any case, the design of the keeper and engaging means therefor should be such that a man can easily release the keeper from its position across the ring opening, but it is practically impossible for an animal caught in the trap but not instantly killed to do so by its struggles. The keeper may be normally positioned across the ring opening in such a way as to maintain the generally circular configuration of the ring. Of course, by widening or altering the position of the opening in the ring member or by altering the shape and location of the keeper engaging means, relative ease of disengaging the keeper from its position across the opening of the ring and ease of freeing the ring from the ends of the frames may be altered. The keeper may also be loosely connected to the actuator, for example by way of a chain, so that the keeper is always held near the ring when not in position across its opening.

The ring in question may be centered on the end of the arm of the spring or offset to either side. It is preferable that the ring be relatively large according to the present invention. If the ring was made very small i.e. only large enough to enclose the adjacent end members, the actuator could not be swivelled through a very great arc before the ring would disengage. On the other hand, with a large ring, a substantial rotation or swivel action of the actuator is possible before the opening in the ring comes to the position at which it disengages. This is an advantage because it permits arrangement of the trap in a wider range of positions, and therefore, increases its versatility. Additionally, larger rings promote faster and more powerful closings of the trap the instant the trigger is tripped.

When actuators having such larger rings, one of which has therein an opening as described above, are used on conventional rotating traps of generally square or rectangular frames, outwardly projecting ears should be placed at each end of adjacent end members disposed within the actuator rings, where these rings of the expanded actuator would rest when in sprung condition. For example, these ears may be located at each of the four corners of one of the frames. These ears prevent the rings from slipping around the 90° angle where the ends meet the jaws and thence down onto either pairs of jaws and also prevent the ring having the opening therein from subsequently disengaging from the frames, thus ensuring that the jaws of the closed trap remain tightly closed. Such ears are not necessary where the frame of the trap is shaped as described in my copending application Ser. No. 208,372, (now U.S. Pat. No. 3,760,531) since the ends meet the jaws in such a trap at an angle such that the rings of the sprung actuator cannot slip onto the jaws of the the trap.

As another safety feature of the trap according to the present invention, a releasable safety clamp is provided for securely holding the arms of the actuator in an almost fully compressed state. A safety hook consisting of a wire, one end of which is connected to one arm of the coil spring and the other end of which is adapted to releasably hook about the other arm of the coil spring to maintain the actuator in an almost fully compressed state, has heretofore been used on rotating frame animal traps to keep the actuator compressed until the trap has been set and thereby assist in the opening and setting of such traps. However, such a known safety hook suffers from the disadvantage that it can readily become accidentally disengaged when the trap is set. Since the arms of actuator are fully compressed when the trap is in set position, the safety hook is thus loose and can be easily, accidentally disengaged.

The safety clamp according to the present invention is movably connected to one arm of the actuator and, when the clamp is closed, defines an aperture within its sides and ends. The clamp is adapted to be purposefully opened to permit the other arm of the actuator, when compressed to be introduced into the aperture. When the clamp is then closed, the actuator is safely held in an almost fully compressed state by the clamp until the clamp is again opened. While this other arm of the actuator is thus held within the aperture of the clamp, the clamp prevents the arms and thus the rings of the actuator from accidentally tightly closing the jaws while the trap is being set. Moreover, when used on an actuator wherein one of the rings has an opening of the kind as described above, the actuator may be almost fully compressed while the open ring does not encircle adjacent ends. The safety clamp for the actuator may then be clamped into place to hold the arms in this almost fully compressed state whereupon the open ring can then be easily placed into its normal operative position about the adjacent ends. The facility yields important advantages of safety and ease of handling.

DESCRIPTION OF THE DRAWINGS

These and other features of this invention will be seen in the following description of the preferred embodiments illustrated in the accompanying figures, in which.

Figure 1:
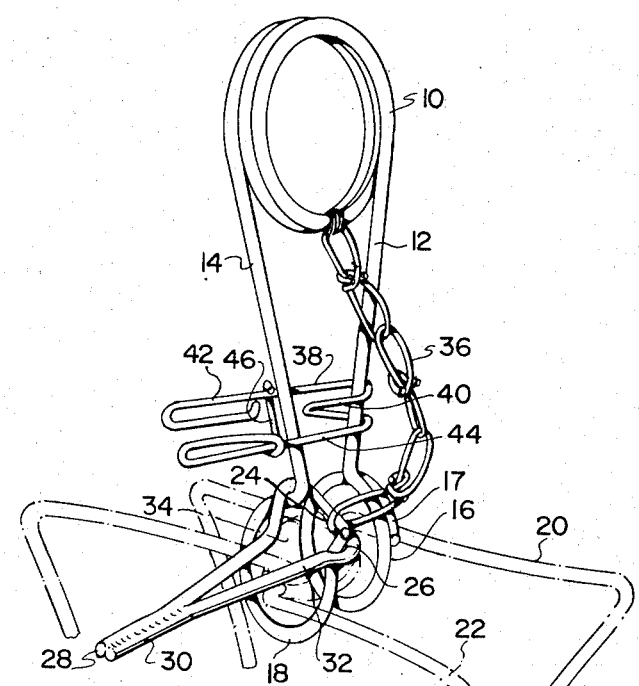
FIG. 1 represents a perspective view of a preferred embodiment of an actuator in accordance with the present invention as it would appear in safety position on an open, set trap.

Similar features are similarly numbered in the drawings.

The partial trap frames illustrated in phantom in FIGS. 1, 2, 3 and 5 are as described in my co-pending application Ser. No. 208,372 (now U.S. Pat. No. 3,760,531).

DESCRIPTION OF THE PREFERRED EMBODIMENTS

The actuator as illustrated in FIGS. 1 to 4 consists of a coil spring 10 having arms 12 and 14 terminating in rings 16 and 18 encircling and slidable along a set of adjacent ends 20 and 22 of the frame of an animal trap. While ring 16 is closed, by reason of the overlapping section 17, ring 18 has an opening 24 located in a portion of the ring proximate to the coil spring 10, which opening is large enough to permit the passage of ends 20 and 22 when the actuator is oriented in an appropriate position, as will be hereinafter described. As can be clearly seen from the drawings, the width of this opening is substantially greater than the diameter of the wire stock of the frames. Spring arm 14 is fixedly connected to one side of the opening while hook-like lip 26 of ring 18 is fixedly connected to the other side.

Figure 2:
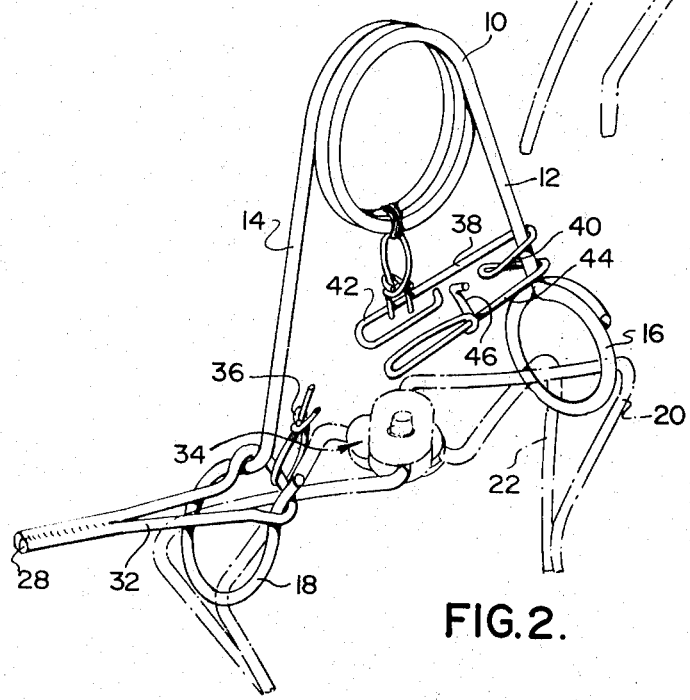
FIG. 2 is a perspective view of the actuator of FIG. 1 on a closed or sprung trap.
Figures 3, 4:
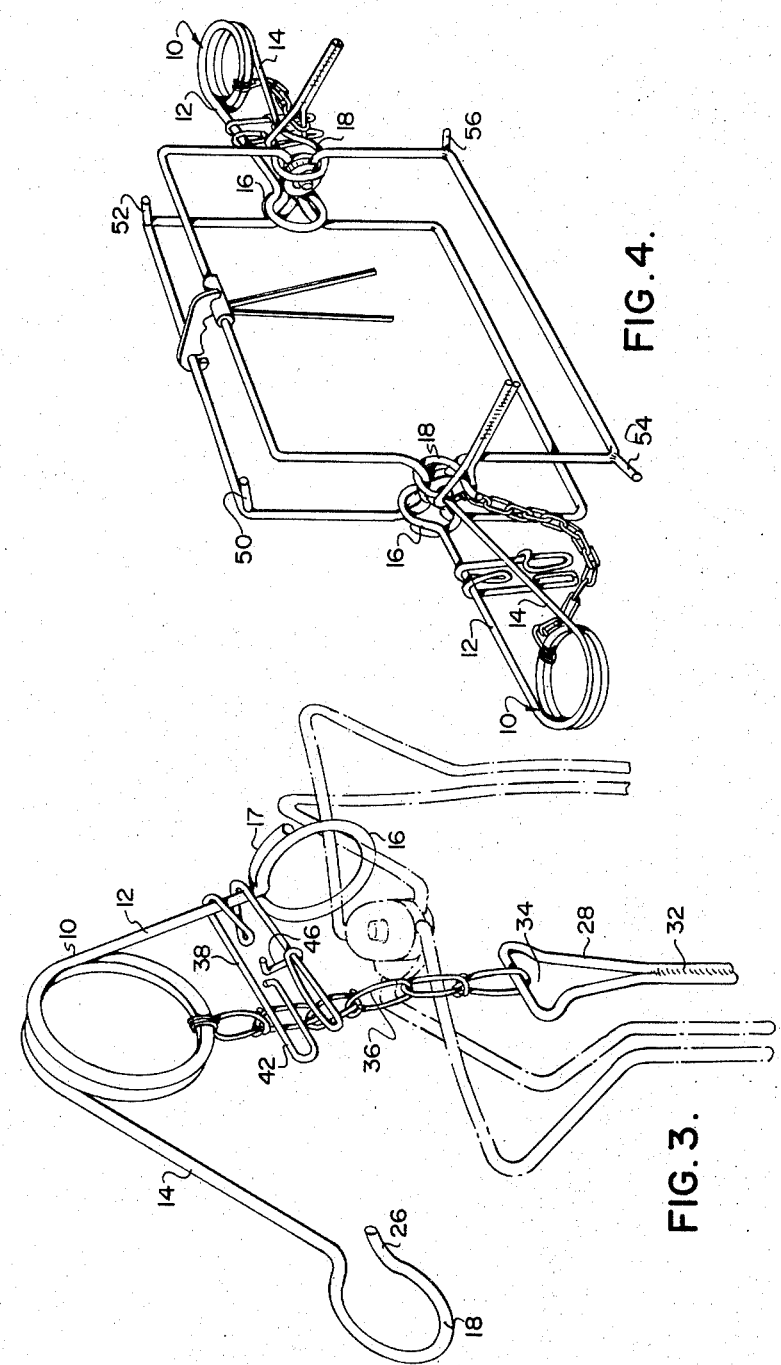
FIG. 3 is a perspective view of the actuator of FIGS. 1 and 2, in which one ring member is no longer in position encircling adjacent ends of the frames.
FIG. 4 is a perspective view of two actuators according to the present invention on a conventional rectangular rotating frame trap, modified according to the present invention.

A keeper 28, consisting of a wire formed into an elongated handle portion 30 and a triangular shaped base portion 32 defining a triangular opening 34 is removably fitted across ring opening 24 as shown in FIGS. 1 and 2. The base angles of triangular opening 34, remote from the handle portion are preferably equal and greater than 60°. The keeper is maintained in place by spring arm 14 and lip 26, each of which securely fits into one of the two corners of the triangular opening in the keeper remote from the handle 30. Keeper 28 is preferably connected to coil spring 10 by chain 36. This chain is of sufficient length to permit the keeper to reach and close the ring opening, but is not long enough to interfere with the normal operation of the trap. The keeper 29, when fitted across ring opening 24, prevents a struggling animal, which has not been instantly killed by the trap from disengaging ring 18 from the frame ends and thereby opening the trap and freeing itself. When it is desired to quickly or easily open the trap jaws from the closed position illustrated in FIG. 2, for example to remove an animal from the trap jaws or free one's fingers accidentally caught therein, coil spring 10 need only be swivelled downward with respect to the frames so that handle portion 30 of the keeper strikes against the jaw of one of the trap frames. The keeper thus becomes dislodged and disengaged from hook-like lip 26 of the ring 18. As the coil spring is swivelled further downward, ends 20 and 22 of the trap frames pass through opening 24 and are freed from within this ring thereby removing the squeezing pressure from the jaws and permitting the jaws to open freely, as illustrated in FIG. 3. In an emergency where, for example, both of the trapper's hands are caught at once in the closed trap, it can be seen that the trap jaws could be opened automatically by swivelling the actuator by banging it for instance against a solid object, to cause the keeper to become disengaged and to have the frame ends then pass through the opening in the ring member.

Spring safety clamp 38 is preferably made of sturdy resilient wire. One end of the clamp consists of an oval helical loop spring 40 adapted to fit loosely around arm 12 of the coil spring. Two arms 42 and 44 extend therefrom in spaced relationship to one another. A transverse abutment member 46, being an extension of arm 44 in the embodiment shown, is adapted to removably hook around the arm 42 of the safety clamp.

When the clamp is in place and the spring is almost fully compressed, arm 14 of the actuator bears against abutment member 46 and is held in that position within the aperture defined by the inner portion of helical loop 40, clamp arms 42 and 44, and the abutment member 46. As shown in FIG. 1, when the trap is in open or set position and spring arms 12 and 14 are fully compressed, spring arm 14 no longer bears against abutment member 46. Upon release of the trap with the safety clamp in position as illustrated in FIG. 1, it can be seen that the outer portion of the helical loop 40 and the abutment member 46 prevent the arms 12 and 14 of the coil-spring from fully spreading. Thus, rings 16 and 18 are prevented from acting on end members 20 and 22 to completely and tightly close the jaws of the trap.

When it is desired to prepare the trap having the safety clamp in place for firing, safety clamp 38 is removed from arm 14, preferably after the trap has been set (whereby the actuator arms are fully compressed), by pressing together the ends of arms of 42 and 44 remote from the elongated helical loop and removing arm 42 from hooked engagement with abutment member 46. Arm 14 may then be slipped out from the aperture within the clamp and the trap is then ready for firing. Safety clamp 38 may be removed from arm 12 by working this arm out of the elongated helical loop by way of the helical spaces between the wire. In normal operation of the trap, however, when the safety clamp is not in use, it is left hanging on the arm 12 of the spring where it does not interfere with the operation of the trap.

If the trap is intended for animals of little value and economy becomes a key factor, keeper 28 and hook-like extension 26, as well as safety clamp 38 could be eliminated without sacrificing the emergency release and safe, easy setting features of the trap provided by the open ring.

Figure 5:
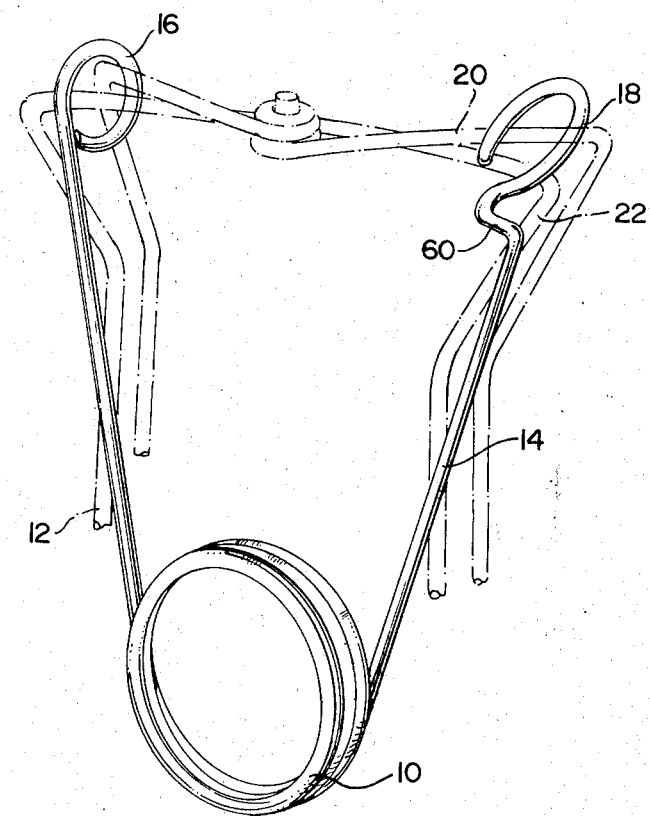
FIG. 5 is a perspective view of an alternative embodiment of an actuator in accordance with the present invention on a closed or sprung trap. The actuator is shown as having been swivelled about the frame ends as far as possible in a direction opposite to the ring opening.

As illustrated in FIG. 5, a shoulder 60 formed in actuator ring 18 on the side of the opening adjacent to actuator arm 14 acts as a stop when the actuator has been swivelled as shown, against which stop frame 22 lodges, preventing the frames from passing through the ring opening. Jamming of the actuator arm 14 against the jaws of the trap is thus avoided. To disengage the actuator from the frame ends of the trap and release the pressure on the trap jaws, the actuator is freely swivelled in the opposite direction. Of course, the safety clamp or keeper, heretofore described, can be used in conjunction with a similar actuator, appropriately modified. In yet another embodiment not illustrated, this stop can be in the form of a radially inwardly protruding projection on the open ring near the actuator arm associated therewith. Other suitable designs for the stop will be readily apparent to one skilled in the art. Slight alterations to design and location of the stop may be made to adopt it to the particular size and shape of the trap on which it is used.

The actuator according to the present invention is particularly useful on a rotating frame trap having frames as described in my copending application Ser. No. 208,372 (now U.S. Pat. No. 3,760,531). Obviously, such a trap combines the advantages of the actuator herein described with those of the frame construction described in that application.

When the actuator according to this invention is used on a rotating frame trap having conventional rectangular frames as shown in FIG. 4, outwardly projecting ears 50, 52, 54 and 56 are provided at each of the four corners of one of the frames of the trap. All ears are of sufficient length to prevent the rings when the actuator is expanded from sliding from the ends onto the jaws of the closed trap. Obviously, the size and positioning of the ears is such that the mounting and tight closing of the trap is not impeded.

Larger rings, required according to the present invention, may be used on the rotating frame trap of conventional square or rectangular frame when provided with these ears. These larger rings in addition, permit quicker and more powerful starts of the trap as soon as the trigger is tripped. Since the rings, because of these ears, cannot slide onto the side members, the jaws of the trap when closed remain together under pressure to effectively kill the animal trapped.

The embodiments of the invention in which an exclusive property or privilege is claimed are defined as follows:

1. In an animal trap of the type having two similar first and second frames made of round wire stock, each having sides serving as jaws and ends extending therebetween, and which are pivotally connected through adjacent ends for relative rotation between set and closed positions about a common axis, trigger means for releasably maintaining the trap in set position and an actuator made of round wire stock, capable of rapidly and forcefully effecting such rotation upon release of the trigger, having two arms spring biased at one end so that the other ends if unobstructed would move to a distance substantially greater than the length of said frame ends, each arm terminating in a ring respectively adapted to encircle adjacent ends of both frames on opposite sides of said axis: a quick release feature which comprises an opening in one of said rings, the other of said rings being completely closed and encircling said adjacent frame ends, the width of the opening in said one ring being substantially greater than the diameter of the wire stock of the frames, and the position and width of said opening being such that, when the actuator, in sprung condition with its rings encircling adjacent ends of the frames of the trap, is swivelled around the frames of the trap, when closed, to a predetermined position (not normally achieved in either the said set or closed position or while the trap is closing), said adjacent frame ends encircled by said one ring can readily pass through the opening, whereby said adjacent frame ends are thereby disengaged from said one ring, thus permitting said other ends of said actuator arms to move apart freely to said distance and at the same time permitting the pressure closing the jaws to be released.

2. An animal trap according to claim 1 wherein said opening is located in a portion of the ring proximate to the spring-biased end of the actuator and the actuator arm.

3. An animal trap according to claim 2 further comprising a keeper adapted to be fastened for purposeful disengagement across said opening whereby said open ring is closed to prevent said adjacent frame ends disposed within said ring from passing through said opening while said keeper is fastened across said opening.

4. An animal trap according to claim 3 wherein the frames are of square or rectangular shape and have outwardly projecting ears located at each end of adjacent frame ends disposed within said rings where the rings of the expanded spring would rest when the trap is in closed position, whereby said ring members are prevented from slipping onto either pair of adjacent side members.

5. An animal trap according to claim 3 wherein said keeper is adapted to be fastened to one arm of the actuator on one side of the opening and to a hook-like lip on the other side of the opening.

6. An animal trap according to claim 5 wherein said keeper comprises an elongated handle portion and a base portion fixed thereto defining a triangular opening, the base of the triangular opening being remote from the handle of the keeper, and the two corners of the triangular opening remote from the handle being adapted to be fastened about said one arm of the actuator and said lip.

7. An animal trap according to claim 6 wherein said keeper, when in fastened position across the opening of the ring, maintains the generally circular configuration of the ring.

8. An animal trap according to claim 7 wherein said triangular opening is in the form of an isosceles triangle having base angles of greater than 60°.

9. An animal trap according to claim 8 wherein said keeper is chained to said actuator.

10. An animal trap according to claim 2 wherein a stop is provided on said open actuator ring near the actuator arm where it does not interfere with the normal operation of this ring to prevent passage of the frames through the ring opening and subsequent jamming of the actuator arms against the frame when the actuator is swivelled in a direction away from the ring opening.

11. An animal trap according to claim 10 wherein said stop consists of a shoulder on said open ring near the actuator arm against which shoulder the trap frames lodge preventing their passing through the ring opening.

12. An animal trap according to claim 2 wherein one arm of the actuator and a hook-like lip form opposite sides of the opening.

* * * * *